US012568025B2

(12) United States Patent
Barton et al.

(10) Patent No.: US 12,568,025 B2
(45) Date of Patent: Mar. 3, 2026

(54) AUTOMATIC CONFIGURATION OF IoT DEVICES FOR ONLINE DATA BROKERAGE SERVICES

(71) Applicant: Cisco Technology, Inc., San Jose, CA (US)

(72) Inventors: Robert E. Barton, Richmond (CA); Flemming Stig Andreasen, Marlboro, NJ (US); Jerome Henry, Pittsboro, NC (US); Daniel Eckstein, Bonn (DE)

(73) Assignee: Cisco Technology, Inc., San Jose, CA (US)

( * ) Notice: Subject to any disclaimer, the term of this patent is extended or adjusted under 35 U.S.C. 154(b) by 102 days.

(21) Appl. No.: 18/106,114

(22) Filed: Feb. 6, 2023

(65) Prior Publication Data

US 2024/0267296 A1 Aug. 8, 2024

(51) Int. Cl.
| | |
|---|---|
| *H04L 41/12* | (2022.01) |
| *H04L 41/0806* | (2022.01) |
| *H04L 67/12* | (2022.01) |
| *H04L 67/51* | (2022.01) |
| *H04L 67/55* | (2022.01) |
| *H04L 67/562* | (2022.01) |

(52) U.S. Cl.
CPC .......... *H04L 41/12* (2013.01); *H04L 41/0806* (2013.01); *H04L 67/55* (2022.05); *H04L 67/562* (2022.05); *H04L 67/12* (2013.01)

(58) Field of Classification Search
CPC ..... H04L 41/12; H04L 41/0806; H04L 67/55; H04L 67/562; H04L 67/12; H04L 67/51
See application file for complete search history.

(56) References Cited

U.S. PATENT DOCUMENTS

| | | | | |
|---|---|---|---|---|
| 10,547,503 | B2 * | 1/2020 | Lear ..................... | H04L 41/0893 |
| 10,708,360 | B2 * | 7/2020 | Venkatesan ......... | H04L 12/2836 |
| 10,819,796 | B2 | 10/2020 | Dinh et al. | |
| 10,862,971 | B2 | 12/2020 | Shanmugam | |
| 10,944,638 | B1 * | 3/2021 | Chamarajnager ... | H04L 41/0843 |
| 10,965,640 | B2 | 3/2021 | Nalluri et al. | |
| 11,190,579 | B1 * | 11/2021 | Barton ................ | H04L 41/0894 |
| 11,411,957 | B2 | 8/2022 | Frahim et al. | |
| 12,088,668 | B2 * | 9/2024 | Petit ..................... | H04L 67/561 |
| 2003/0200285 | A1 * | 10/2003 | Hansen ............... | H04L 41/0806 |
| | | | | 709/220 |
| 2017/0060574 | A1 * | 3/2017 | Malladi ................... | H04W 4/70 |
| 2017/0201504 | A1 * | 7/2017 | Funk ................... | H04L 63/0471 |
| 2018/0011694 | A1 * | 1/2018 | Al-Fuqaha ............... | G06F 8/38 |
| 2018/0270310 | A1 * | 9/2018 | Venkatesan ......... | H04L 67/1001 |
| 2019/0334995 | A1 * | 10/2019 | Shanmugam .......... | H04W 4/80 |
| 2019/0356542 | A1 * | 11/2019 | Chamarajnager ... | H04L 63/0823 |
| 2019/0373081 | A1 * | 12/2019 | Jung ..................... | H04L 67/125 |
| 2020/0021669 | A1 * | 1/2020 | Bikumala ............... | H04W 4/70 |
| 2020/0162503 | A1 * | 5/2020 | Shurtleff ................ | G06F 9/451 |
| 2020/0220931 | A1 * | 7/2020 | Dinh ................... | H04L 41/5019 |

(Continued)

*Primary Examiner* — Alina A Boutah

(74) *Attorney, Agent, or Firm* — Lee & Hayes, P.C.

(57) ABSTRACT

In one embodiment, a device in a local network obtains discovery data for a node in the local network. The device provides the discovery data to a device management service. The device receives, based on the discovery data, a brokerage configuration for the node from the device management service. The device configures the node with the brokerage configuration to publish data generated by the node to one or more data brokerage services.

20 Claims, 8 Drawing Sheets

(56) References Cited

U.S. PATENT DOCUMENTS

| | | | | |
|---|---|---|---|---|
| 2021/0152434 A1* | 5/2021 | Chamarajnager | ..... | H04L 41/046 |
| 2021/0314407 A1* | 10/2021 | Ng | ......... | H04L 67/562 |
| 2022/0014594 A1 | 1/2022 | Mladin et al. | | |
| 2022/0021665 A1* | 1/2022 | Barton | .................... | H04L 63/08 |
| 2022/0038335 A1* | 2/2022 | Barton | ................. | H04L 67/125 |
| 2022/0084692 A1* | 3/2022 | Wengrovitz | ............ | H04L 67/12 |
| 2022/0141290 A1* | 5/2022 | Chelmecki | ............ | H04L 67/562 |
| | | | | 709/220 |
| 2022/0231952 A1 | 7/2022 | Barton et al. | | |
| 2022/0263820 A1 | 8/2022 | Barton et al. | | |
| 2022/0321484 A1* | 10/2022 | Barton | ................. | H04L 47/193 |
| 2022/0417219 A1* | 12/2022 | Sheriff | .................... | H04L 67/56 |
| 2023/0216947 A1* | 7/2023 | Bernardi | ................ | H04L 67/10 |
| | | | | 713/150 |
| 2023/0412696 A1* | 12/2023 | Sandler | .................. | H04L 69/08 |
| 2024/0039820 A1* | 2/2024 | Beadle | ................. | H04L 67/025 |
| 2024/0089337 A1* | 3/2024 | Wakabayashi | ...... | H04W 72/044 |
| 2024/0223656 A1* | 7/2024 | Gomez | .................. | H04L 67/12 |
| 2024/0235864 A1* | 7/2024 | Malone | ................. | H04L 67/141 |
| 2024/0256249 A1* | 8/2024 | Pradhan | ................ | G16Y 10/40 |

* cited by examiner

AUTOMATIC CONFIGURATION OF IoT DEVICES FOR ONLINE DATA BROKERAGE SERVICES

TECHNICAL FIELD

The present disclosure relates generally to computer networks, and, more particularly, to the automatic configuration of Internet of Things (IoT) devices for online data brokerage services.

BACKGROUND

The Internet of Things, or "IoT" for short, represents an evolution of computer networks that seeks to connect many everyday objects to the Internet. Notably, there has been a recent proliferation of 'smart' devices that are Internet-capable such as thermostats, lighting, televisions, cameras, and the like. In many implementations, these devices may also communicate with one another. For example, an IoT motion sensor may communicate with one or more smart lightbulbs, to actuate the lighting in a room when a person enters the room. Vehicles are another class of 'things' that are being connected via the IoT for purposes of sharing sensor data, implementing self-driving capabilities, monitoring, and the like.

A major aspect of the IoT is the collection of data from IoT devices for various purposes. For instance, a motion sensor may report its measurements to a security service that monitors a building for unauthorized entry. As the IoT has matured, though, the number of potential consumers for sensor measurements and other data from an IoT device have also increased. For instance, in addition to the measurements from the motion sensor being used by the security service, a smart lighting service could also leverage the same motion data to turn the lights in the building off when unoccupied. To support this, online data brokerage services have arisen, allowing different data producers and different data consumers to efficiently transmit data between one another. Unfortunately, though, configuring an IoT device for use with a brokerage service today is largely a manual and error-prone task, as multiple brokers may be in use and details of a broker may change over time.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
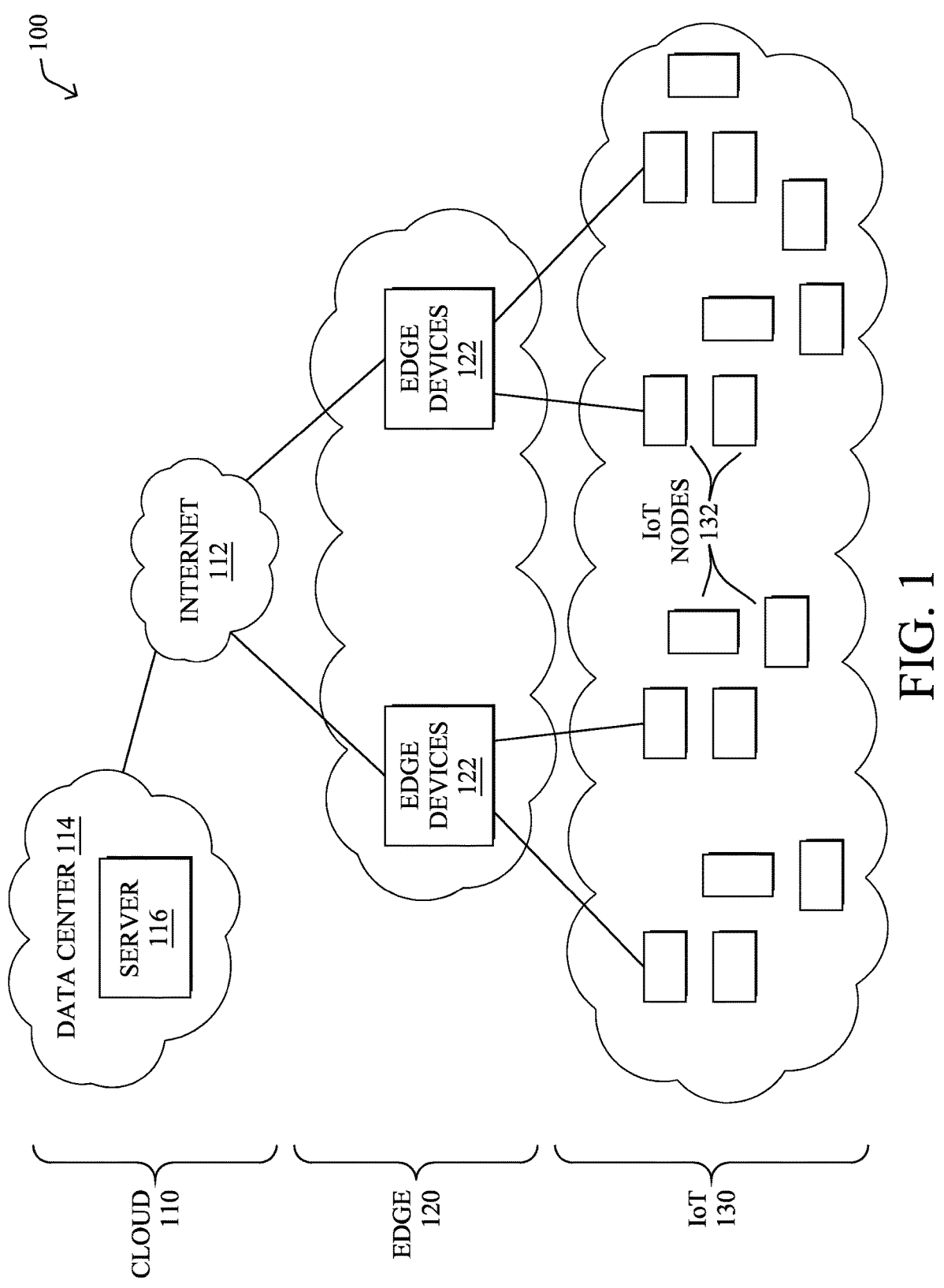
FIG. 1 illustrate an example network.

According to one or more embodiments of the disclosure, a device in a local network obtains discovery data for a node in the local network. The device provides the discovery data to a device management service. The device receives, based on the discovery data, a brokerage configuration for the node from the device management service. The device configures the node with the brokerage configuration to publish data generated by the node to one or more data brokerage services.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Edge computing, also sometimes referred to as "fog" computing, is a distributed approach of cloud implementation that acts as an intermediate layer from local networks (e.g., IoT networks) to the cloud (e.g., centralized and/or shared resources, as will be understood by those skilled in the art). That is, generally, edge computing entails using devices at the network edge to provide application services, including computation, networking, and storage, to the local nodes in the network, in contrast to cloud-based approaches that rely on remote data centers/cloud environments for the services. To this end, an edge node is a functional node that is deployed close to IoT endpoints to provide computing, storage, and networking resources and services. Multiple edge nodes organized or configured together form an edge compute system, to implement a particular solution. Edge nodes and edge systems can have the same or complementary capabilities, in various implementations. That is, each individual edge node does not have to implement the entire spectrum of capabilities. Instead, the edge capabilities may be distributed across multiple edge nodes and systems, which may collaborate to help each other to provide the desired services. In other words, an edge system can include any number of virtualized services and/or data stores that are spread across the distributed edge nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example IoT network 100, three illustrative layers are shown, namely cloud layer 110, edge layer 120, and IoT device layer 130. Illustratively, the cloud layer 110 may comprise general connectivity via the Internet 112, and may contain one or more datacenters 114 with one or more centralized servers 116 or other devices, as will be appreciated by those skilled in the art. Within the edge layer 120, various edge devices 122 may perform various data processing functions locally, as opposed to datacenter/cloud-based servers or on the endpoint IoT nodes 132 themselves of IoT device layer 130. For example, edge devices 122 may include edge routers and/or other networking devices that provide connectivity between cloud layer 110 and IoT device layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc.), PLC protocols, or other shared-media protocols where appropriate. In this context, a protocol consists of a set of rules defining how the nodes interact with each other.

Figure 2:
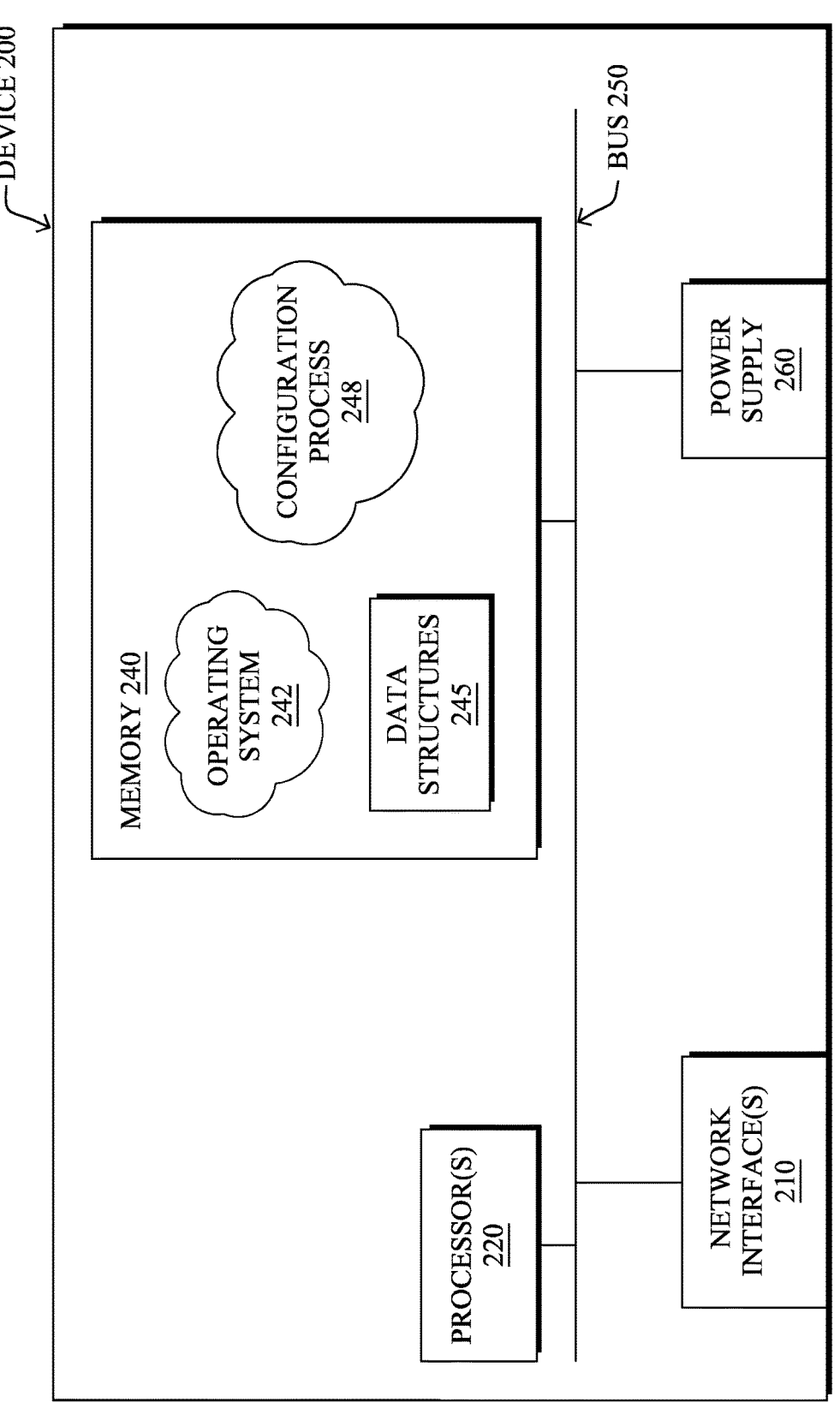
FIG. 2 illustrates an example network device/node.

FIG. 2 is a schematic block diagram of an example node/device 200 that may be used with one or more embodiments described herein, e.g., as any of the nodes or devices shown in FIG. 1 above or described in further detail below. The device 200 may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

Network interface(s) 210 include the mechanical, electrical, and signaling circuitry for communicating data over links coupled to the network. The network interfaces 210 may be configured to transmit and/or receive data using a variety of different communication protocols, such as TCP/IP, UDP, etc. Note that the device 200 may have multiple different types of network connections, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes/services may comprise an illustrative configuration process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Figure 3:
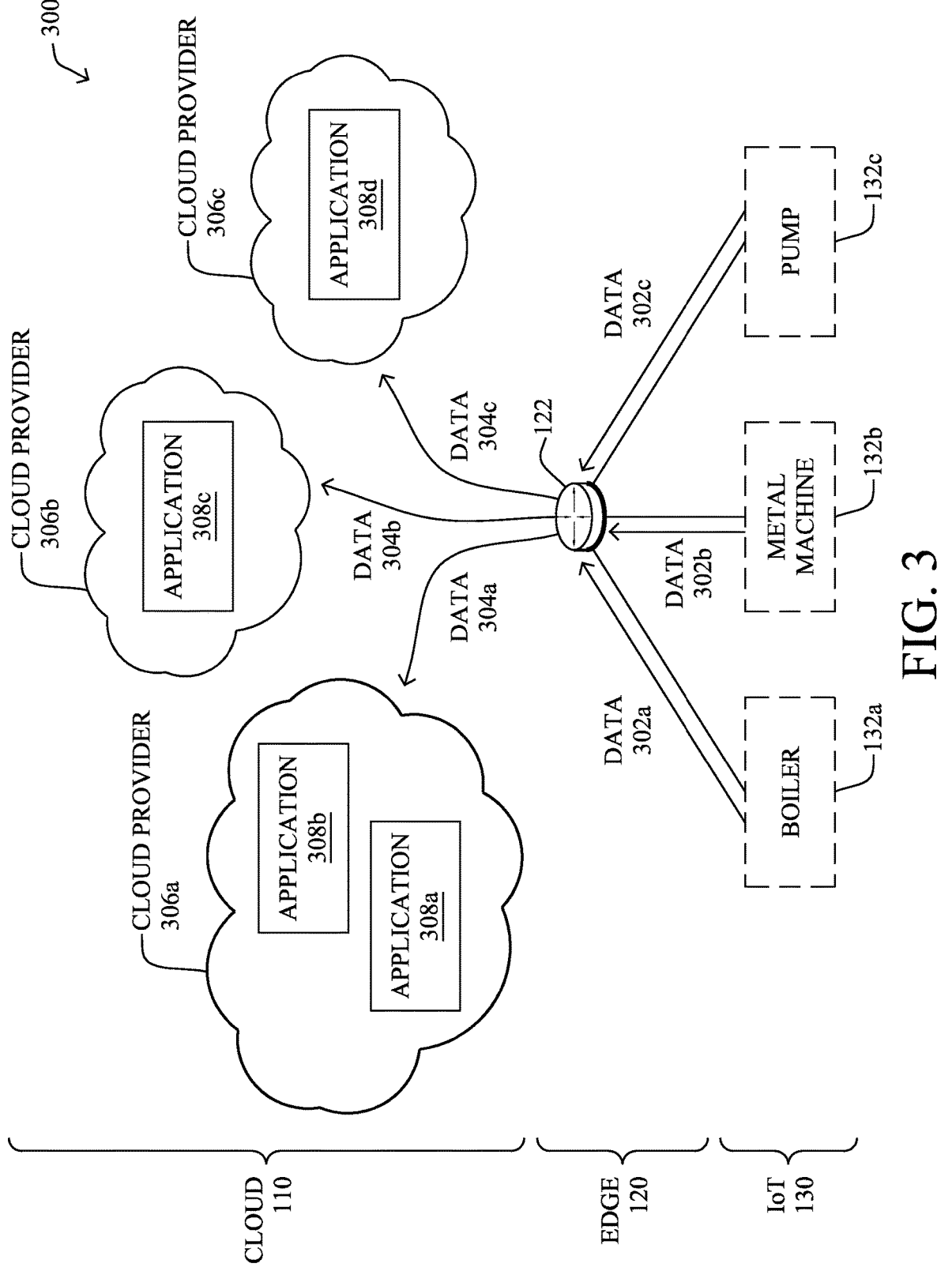
FIG. 3 illustrates an example network architecture for edge to multi-cloud processing and governance.

FIG. 3 illustrates an example network architecture 300 for edge to multi-cloud processing and governance, according to various embodiments. As shown, consider the case of an IoT network at IoT layer 130 that comprises a plurality of nodes 132, such as node 132a (e.g., a boiler), node 132b (e.g., a metal machine), and node 132c (e.g., a pump). Notably, the IoT network at IoT layer 130 may comprise any numbers of sensors and/or actuators. For instance, the network may be located in an industrial setting, such as a factory, port, substation, or the like, a smart city, a stadium, a conference or office building, or any other location in which IoT devices may be deployed.

As shown, assume that IoT nodes 132a-132c generate data 302a-302c, respectively, for consumption by any number of applications 308 hosted by different cloud and service/platform providers 306, such as Microsoft Azure, Software AG, Quantela, or the like. The different applications 308 may also require different sets of data 304a-304c from data 302a-302c. For instance, assume that provider 306a hosts application 3083a, which is a monitoring application used by the operator of the IoT network. In addition, provider 306a may also host application 308b, which is a developer application that allows the operator of the IoT network to develop and deploy utilities and configurations for the IoT network. Another application, application 308c, may be hosted by an entirely different provider 306b and be used by the vendor or manufacturer of a particular IoT node 132 for purposes. Finally, a further application, application 308d, may be hosted by a third provider 306c, which is used by technicians for purposes of diagnostics and the like.

As noted above, a major aspect of the IoT is the collection of data from IoT nodes/devices so that the data can be analyzed. Today, it is becoming increasingly common for an IoT node to publish data to an online data brokerage service that, in turn, sends the data to a backend data warehouse or service where it can be analyzed (such as AWS IoT Core, Azure IoT Hub, and many others offered by IoT vendors). In effect, the broker acts as a go-between whereby the data may be ingested, normalized or otherwise transformed, and/or queued before being sent to the backend data service(s) that consume the data. In addition, the broker also provides an important security function by preventing the IoT node from communicating directly with the backend data service.

In most cases, the broker is an edge function that is located near the IoT endpoint, such as at edge device 122 shown in FIG. 3. In addition, a single IoT deployment will also likely have many brokers distributed throughout the network that aggregated the data and potentially add in the local context, as well. Thus, when an IoT node starts to communicate, it sends data first to the local broker service, and then the broker service sends it to the backend data service(s)/application(s) that. For this to work correctly, the IoT node needs to know details of the local broker service. At a minimum, this includes the address of the broker, topic identifier(s) for the topic(s) to which the data is to be published, quality of service (QoS) level information, or the like. Traditionally, this configuration is performed manually when the IoT node is installed, which is often error prone, as multiple brokers might be in use and details of the broker may change over time. For example, communication to a Message Queueing Telemetry Transport (MQTT) broker requires that the IoT node 132 knows the location (address) of the correct MQTT server, the topic that it must use (MQTT organizes all communication into "topics"), security related configuration for authorization and authentication, and QoS level of the MQTT session.

—Automatic Configuration of IoT Devices for Online Data Brokerage Services—

The techniques introduced herein provide for the automatic configuration of IoT endpoints with data messaging information, such as their MQTT broker location, MQTT Topic, etc. In some aspects, the techniques herein first discover the IoT nodes using a Layer-2 discovery protocol or similar discovery mechanism, to configure specific device types with their specific publisher details, so as to allow automatic IoT messaging to a broker.

Illustratively, the techniques described herein may be performed by hardware, software, and/or firmware, such as in accordance with configuration process 248, which may include computer executable instructions executed by the processor 220 (or independent processor of interfaces 210) to perform functions relating to the techniques described herein.

Specifically, in various embodiments, a device in a local network obtains discovery data for a node in the local network. The device provides the discovery data to a device management service. The device receives, based on the discovery data, a brokerage configuration for the node from the device management service. The device configures the node with the brokerage configuration to publish data generated by the node to one or more data brokerage services.

Operationally, FIGS. 4A-4D illustrate an example 400 of the automatic configuration of an IoT node to communicate with a brokerage service, according to various embodiments. Continuing the example of FIG. 3, again assume that there is a local network that comprises any number of IoT nodes, such as IoT node 132*d*, as well as various edge devices, such as the edge device 122 shown. In addition, there may be any number of cloud providers, such as providers 306*a*-306*c* that host various applications 308, as described previously with respect to FIG. 3.

In many instances, there may be one or more data brokerage services that broker data generated by the IoT nodes of the local network, such as data generated by IoT node 132*d*, to any of its consuming applications 308. For instance, edge device 122 may host a data brokerage service that brokers data generated by IoT node IoT node 132*d* and applications, such as applications 308*a*-308*b* shown. Of course, other data brokers may also be present within the local network (e.g., on switches, routers, etc.) and/or external to the local network (e.g., hosted by a provider 306), as well.

By way of example, assume that edge device 122 hosts an MQTT message broker that is used to send data from any of the IoT nodes in the local network to any of applications 308. In other instances, other messaging protocols could also be used, such as, but not limited to, Open Platform Communications Unified Architecture (OPC-UA) Advanced Message Queueing Protocol (AMQP), and the like. Regardless, any IoT node 132 that is to send its data to the data broker at edge device 122 will need to first be configured to do so.

Figure 4A:
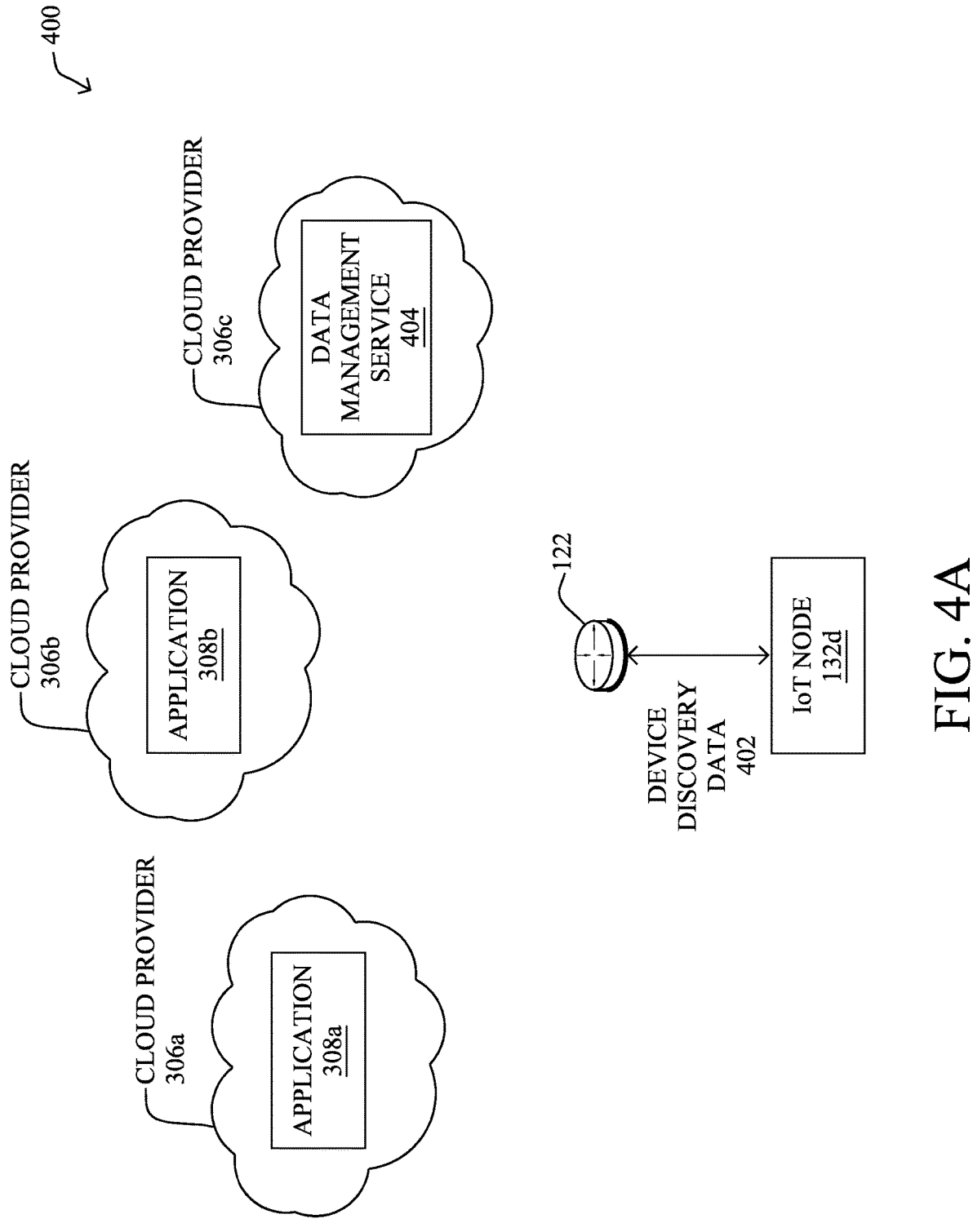
FIGS. 4A-4D illustrate an example of the automatic configuration of an IoT node to communicate with a brokerage service.

In various embodiments, as shown in FIG. 4A, edge device 122 may obtain device discovery data 402 regarding IoT node 132*d*. As would be appreciated, when an IoT node is initially deployed to the local network, it may be connected to various industrial networking equipment, such as switches, routers, access points, or the like. In various embodiments, such equipment may leverage a device discovery protocol, such as the Link Layer Discovery Protocol (LLDP), Cisco Discovery Protocol (CDP), etc., which can be used to discover nodes/devices connected to an Ethernet network. As would be appreciated, such a protocol is able to discover information such as the device type, manufacturer, firmware version, local context information (e.g., a location in the network) or the like, of IoT node 132*d*. In turn, the resulting device discovery data 402 may be captured and sent to edge device 122. In further embodiments, device discovery data 402 could also be generated in whole, or in part, by analyzing the traffic generated by IoT node 132*d*, such as by performing deep packet inspection (DPI) on the traffic.

Figure 4B:
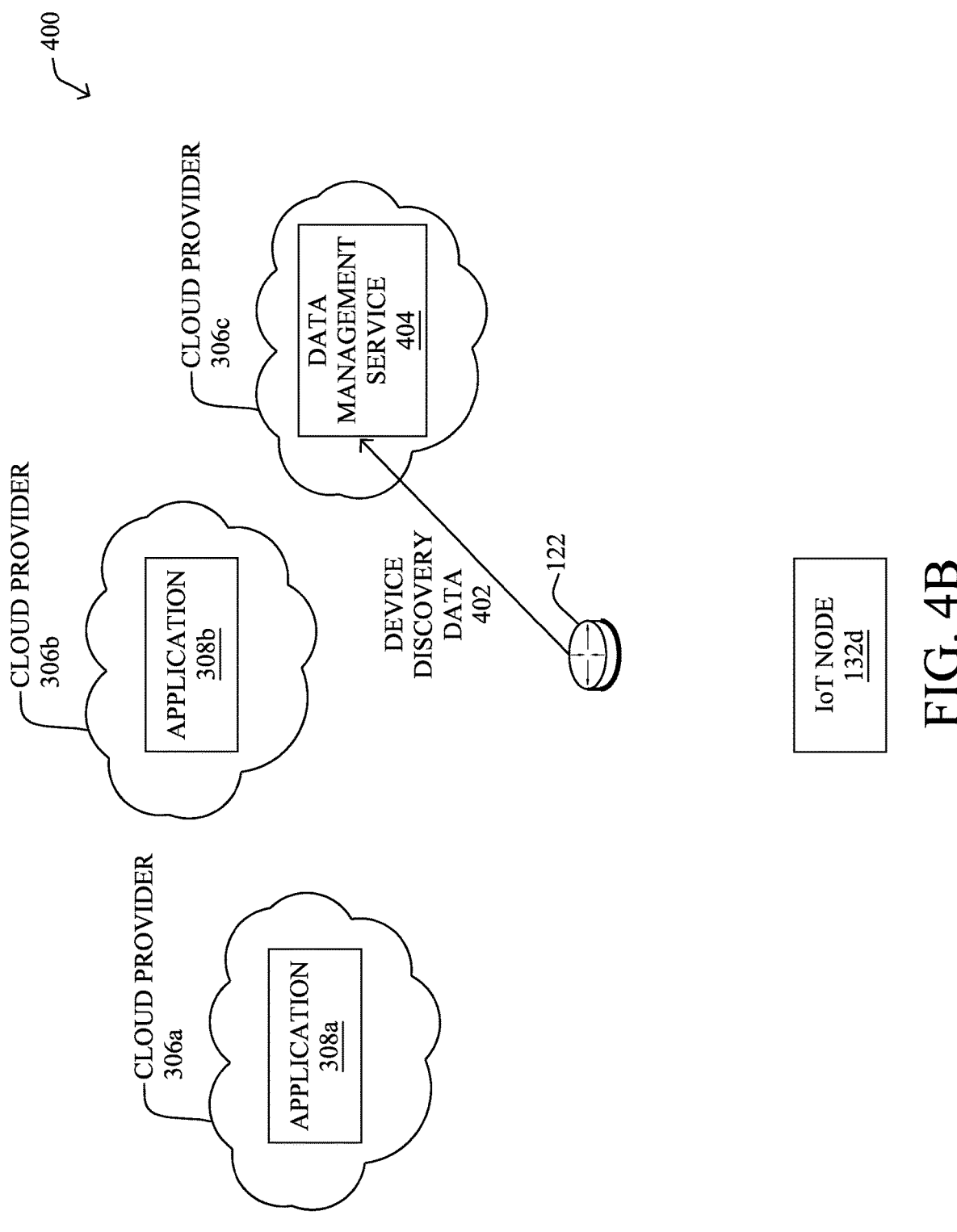

In FIG. 4B, once IoT node 132*d* has been discovered, edge device 122 may provide device discovery data 402 to a device management service 404 (e.g., Edge Intelligence or another management service) that may be cloud-hosted and/or edge-hosted. For instance, while device management service 404 is shown as being hosted by provider 306*c*, some or all of its functionality could also be integrated directly into the edge layer of the local network, such as at edge device 122. This allows device management service 404 to build an inventory of all of the IoT nodes 132 discovered in the network, as well as their characteristics, such as their device types, manufacturers, firmware or other software configurations, etc.

Figure 4C:
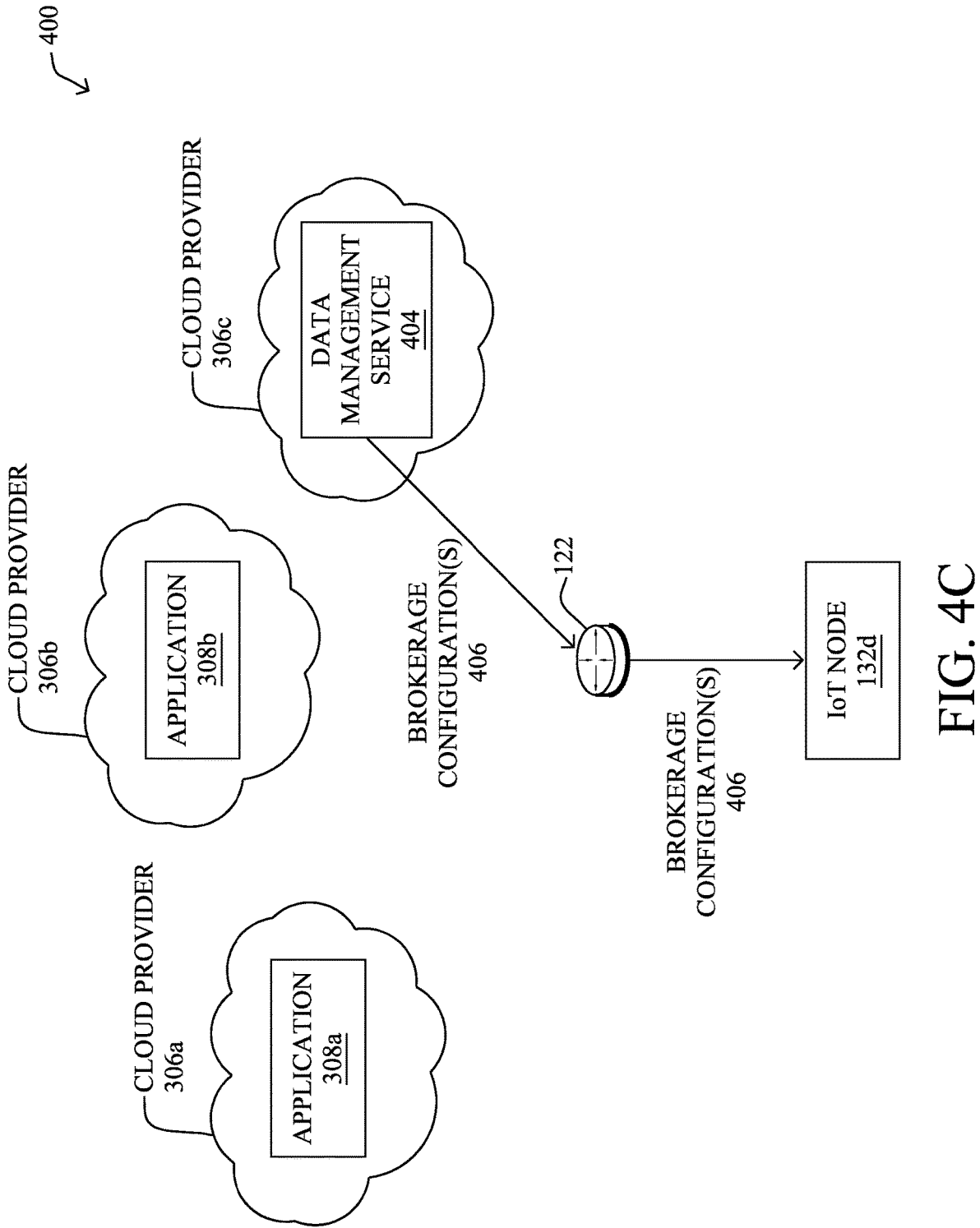

In FIG. 4C, device management service 404 may then determine the correct brokerage configuration(s) 406 for IoT node 132*d* and/or other nodes in the inventory. In various embodiments, configuration(s) 406 may indicate any or all of the following, among others:

The type of brokerage messaging the indicated node is to use (e.g. MQTT, OPC-UQ, etc.)

Which data brokerage services/brokers, if any, the node should use. Note that different brokers may also manage different types of devices and information.

The messaging topic(s) that should be used by the indicated IoT node (e.g., MQTT Topic). For example, vibration sensors may publish data based on their readings to a brokerage topic for "vibration," temperature sensors may publish data based on their readings to a topic for temperature, etc. Note also that configuration(s) 406 may indicate that any given IoT node 132 should also send multiple types of data to different indicated topics, either at the same broker or across different brokers.

The QoS level the device should use (QoS level is mandatory for MQTT).

The type of authentication to be used (e.g., none, password, or certificate based), the digital identify to be used for authentication against the data brokerage service, or other such information.

In other words, device management service 404 may select configuration(s) 406 for IoT node 132*d* according to a policy that is based on the device type, name, firmware, manufacturer, location in the network (i.e. local context), etc. of IoT node 132*d*. Once device management service 404 has selected configuration(s) 406, it may send configuration(s) 406 back to edge device 122. In turn, edge device 122 may configure IoT node 132*d* using configuration(s) 406, accordingly.

In various embodiments, edge device 122 may configure IoT node 132*d* using configuration(s) 406 in a number of ways. In some embodiments, this could be done by leveraging LLDP messaging. More specifically, configuration(s) 406 could be unicast to IoT node 132*d* via an Ethernet switch. Such configuration details could be unique on a per-port basis, based on the attached IoT node, and include more specific details which can be used by the IoT node to configure itself, automatically. In another embodiment, 802.11 Generic Advertisement Service (GAS) frames could also be used to convey configuration(s) 406 to IoT node 132*d*. In yet another embodiment, configuration(s) 406 could be conveyed via an option in a Dynamic Host Configuration Protocol (DHCP) lease that is either programmed on the DHCP server, or inserted on the fly by edge device 122.

Figure 4D:
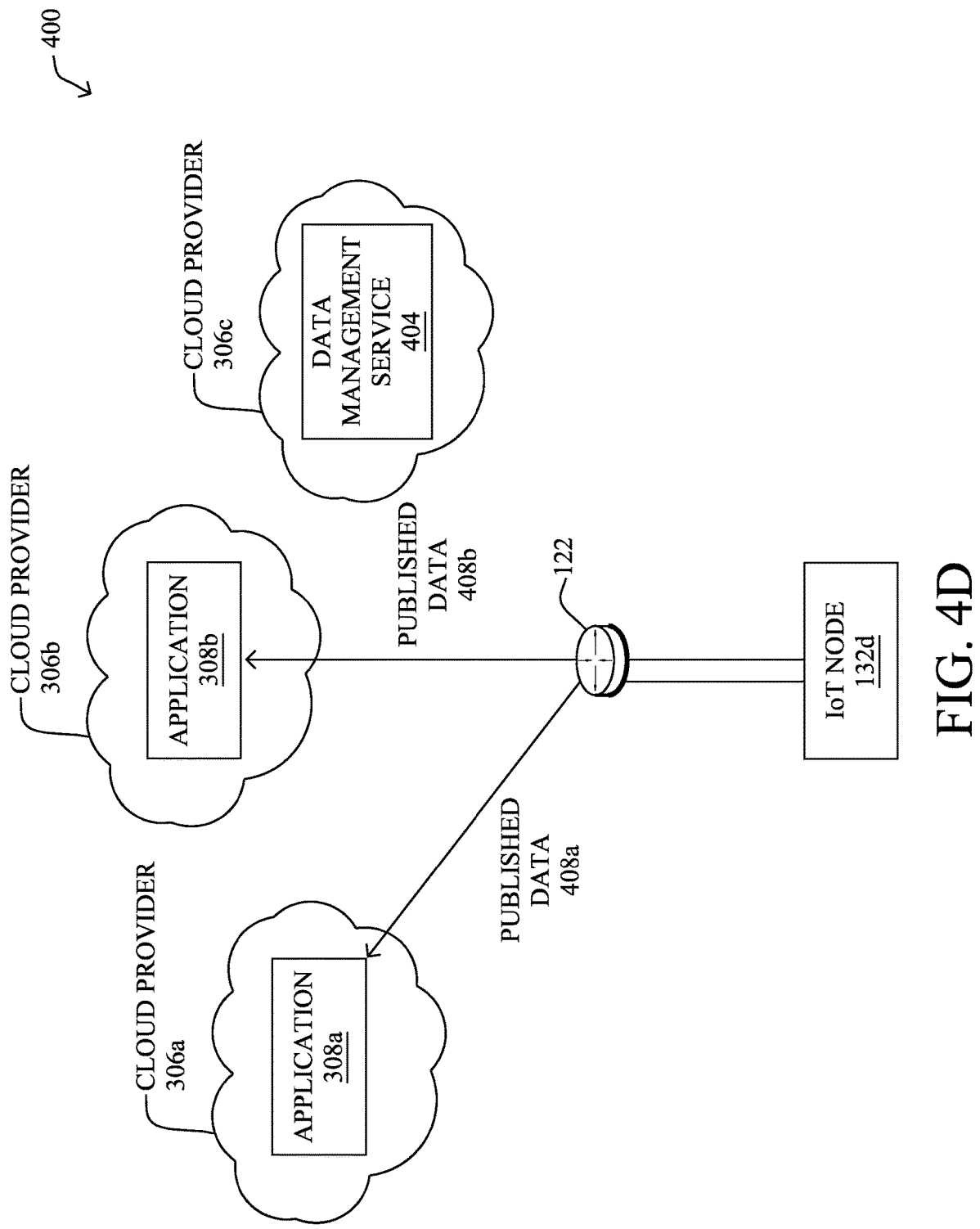

In FIG. 4D, IoT node 132*d* may use configuration(s) 406 to configure itself to publish its generated data to one or more data brokerage services. For instance, assume that IoT node 132*d* comprises a temperature sensor and a humidity sensor, shown as published data 408*a*-408*b*, respectively. In such a case, configuration(s) 406 may configure IoT node 132*d* to report its temperature and humidity measurements (either raw or aggregated/averaged) to the data broker of edge device 122. In turn, edge device 122 may provide published data 408*a* (e.g., the temperature data) to application hosts application 308*a* for analysis and published data 408*b* to application 308*b* (e.g., the humidity data) for analysis.

In other words, the techniques herein allow for the automatic discovery of IoT nodes in a local network, which can then be used to automatically configure these nodes to publish (and/or subscribe) to any number of data brokerage services and without the need for manual intervention.

Figure 5:
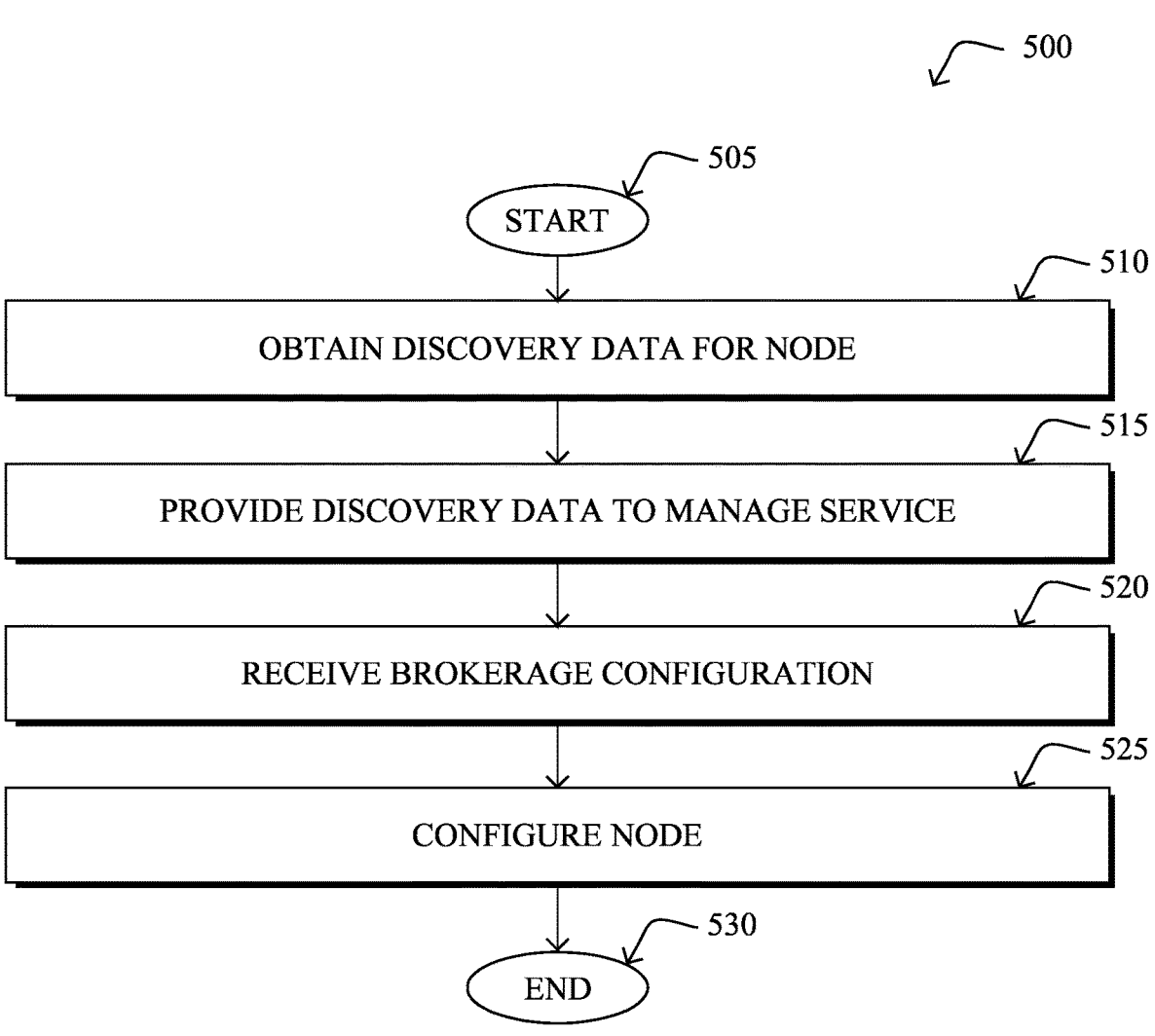
FIG. 5 illustrates an example simplified procedure for the automatic configuration of an IoT node to use an online brokerage service.

FIG. 5 illustrates an example simplified procedure for the automatic configuration of an IoT node to use an online brokerage service, in accordance with one or more embodiments described herein. The procedure 500 may start at step 505, and continues to step 510, where, as described in greater detail above, a specifically-configured, first device (e.g., device 200) may obtain discovery data for a node in the local network. In some embodiments, the device is an edge router or switch located at an edge of the local network. In further embodiments, the node comprises a sensor and generates data based on sensor measurements from the sensor.

At step 515, as detailed above, the device may provide the discovery data to a device management service. In some embodiments, the discovery data comprises at least one of: Link Layer Discovery Protocol (LLDP) data regarding the node, 802.11 Generic Advertisement Service (GAS) data regarding the node, Dynamic Host Configuration Protocol (DHCP) data regarding the node, or Cisco Discovery Protocol (CDP) data regarding the node. In further embodiments, the discovery data indicates one or more of: a device type associated with the node, a manufacturer of the node, firmware information for the node, or a location of the node in the local network.

At step 520, the device may receive, based on the discovery data, a brokerage configuration for the node from the device management service, as described in greater detail above. In some embodiments, the one or more data brokerage services comprises a Message Queueing Telemetry Transport (MQTT) service.

At step 525, as detailed above, the device may configure the node with the brokerage configuration to publish data generated by the node to one or more data brokerage services. In some embodiments, the device may do so by configuring the node to publish the data generated by the node to a topic at the one or more data brokerage services specified by the brokerage configuration. In further embodiments, the device may do so by configuring the node to send the data generated by the node to the one or more data brokerage services using a quality of service (QoS) level specified by the brokerage configuration. In yet other embodiments, the device may do so by configuring the node to send the data generated by the node to the one or more data brokerage services using a type of authentication specified by the brokerage configuration. In some embodiments, the node published the data generated by the node to the one or more data brokerage services via Open Platform Communications Unified Architecture (OPC-UA) or Advanced Message Queueing Protocol (AMQP) messages.

Procedure 500 then ends at step 530.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments for the automatic configuration of Internet of Things (IoT) devices for online data brokerage services, it is to be understood that various other adaptations and modifications may be made within the intent and scope of the embodiments herein. For example, while specific protocols are used herein for illustrative purposes, other protocols and protocol connectors could be used with the techniques herein, as desired. Further, while the techniques herein are described as being performed by certain locations within a network, the techniques herein could also be performed at other locations, such as at one or more locations fully within the local network (e.g., by the edge device), etc.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method comprising:
   obtaining, by a device in a local network, discovery data for a node in the local network, the device being distinct from the node;
   providing, by the device, the discovery data to a device management service;
   receiving, at the device and based on the discovery data, a brokerage configuration for the node from the device management service, wherein the brokerage configuration is generated according to a policy based on characteristics of the node indicated by the discovery data, and comprises an indication of one or more data brokerage services that the node is to use and one or more of i) topics or ii) authentication parameters for the one or more data brokerage services that the node is to use; and
   configuring, by the device, the node by providing the brokerage configuration to the node for automatic application by the node to publish data generated by the node to the one or more data brokerage services.

2. The method as in claim 1, wherein the device is an edge router or switch located at an edge of the local network.

3. The method as in claim 1, wherein the discovery data comprises at least one of: Link Layer Discovery Protocol (LLDP) data regarding the node, 802.11 Generic Advertisement Service (GAS) data regarding the node, Dynamic Host Configuration Protocol (DHCP) data regarding the node, or Cisco Discovery Protocol (CDP) data regarding the node.

4. The method as in claim 1, wherein the discovery data indicates one or more of: a device type associated with the node, a manufacturer of the node, firmware information for the node, or a location of the node in the local network.

5. The method as in claim 1, wherein configuring the node with the brokerage configuration to publish data generated by the node to one or more data brokerage services by:
   configuring the node to publish the data generated by the node to a topic at the one or more data brokerage services specified by the brokerage configuration.

6. The method as in claim 1, wherein configuring the node with the brokerage configuration to publish data generated by the node to one or more data brokerage services by:
   configuring the node to send the data generated by the node to the one or more data brokerage services using a quality of service (QOS) level specified by the brokerage configuration.

7. The method as in claim 1, wherein configuring the node with the brokerage configuration to publish data generated by the node to one or more data brokerage services by:

configuring the node to send the data generated by the node to the one or more data brokerage services using a type of authentication specified by the brokerage configuration.

8. The method as in claim 1, wherein the one or more data brokerage services comprises a Message Queueing Telemetry Transport (MQTT) service.

9. The method as in claim 1, wherein the node published the data generated by the node to the one or more data brokerage services via Open Platform Communications Unified Architecture (OPC-UA) or Advanced Message Queueing Protocol (AMQP) messages.

10. The method as in claim 1, wherein the node comprises a sensor, and wherein the data generated by the node is based on sensor measurements from the sensor.

11. An apparatus, comprising:
one or more network interfaces;
a processor coupled to the one or more network interfaces and configured to execute one or more processes; and
a memory configured to store a process that is executable by the processor, the process when executed configured to:
obtain discovery data for a node in a local network, the apparatus being distinct from the node;
provide the discovery data to a device management service;
receive, based on the discovery data, a brokerage configuration for the node from the device management service, wherein the brokerage configuration is generated according to a policy based on characteristics of the node indicated by the discovery data, and comprises an indication of one or more data brokerage services that the node is to use and one or more of i) topics or ii) authentication parameters for the one or more data brokerage services that the node is to use; and
configure the node by providing the brokerage configuration to the node for automatic application by the node to publish data generated by the node to the one or more data brokerage services.

12. The apparatus as in claim 11, wherein the apparatus is an edge router or switch located at an edge of the local network.

13. The apparatus as in claim 11, wherein the discovery data comprises at least one of: Link Layer Discovery Protocol (LLDP) data regarding the node, 802.11 Generic Advertisement Service (GAS) data regarding the node, Dynamic Host Configuration Protocol (DHCP) data regarding the node, or Cisco Discovery Protocol (CDP) data regarding the node.

14. The apparatus as in claim 11, wherein the discovery data indicates one or more of: a device type associated with the node, a manufacturer of the node, firmware information for the node, or a location of the node in the local network.

15. The apparatus as in claim 11, wherein the apparatus configures the node with the brokerage configuration to publish data generated by the node to one or more data brokerage services by:
configuring the node to publish the data generated by the node to a topic at the one or more data brokerage services specified by the brokerage configuration.

16. The apparatus as in claim 11, wherein the apparatus configures the node with the brokerage configuration to publish data generated by the node to one or more data brokerage services by:
configuring the node to send the data generated by the node to the one or more data brokerage services using a quality of service (QOS) level specified by the brokerage configuration.

17. The apparatus as in claim 11, wherein the apparatus configures the node with the brokerage configuration to publish data generated by the node to one or more data brokerage services by:
configuring the node to send the data generated by the node to the one or more data brokerage services using a type of authentication specified by the brokerage configuration.

18. The apparatus as in claim 11, wherein the one or more data brokerage services comprises a Message Queueing Telemetry Transport (MQTT) service.

19. The apparatus as in claim 11, wherein the node comprises a sensor, and wherein the data generated by the node is based on sensor measurements from the sensor.

20. A tangible, non-transitory, computer-readable medium storing program instructions that cause a device to execute a process comprising:
obtaining, by the device, discovery data for a node in a local network, the device being distinct from the node;
providing, by the device, the discovery data to a device management service;
receiving, at the device and based on the discovery data, a brokerage configuration for the node from the device management service, wherein the brokerage configuration is generated according to a policy based on characteristics of the node indicated by the discovery data, and comprises an indication of one or more data brokerage services that the node is to use and one or more of i) topics or ii) authentication parameters for the one or more data brokerage services that the node is to use; and
configuring, by the device, the node by providing the brokerage configuration to the node for automatic application by the node to publish data generated by the node to the one or more data brokerage services.

* * * * *